Dec. 15, 1953 W. C. PICKARD 2,662,292
SPACE MEASURING MEANS
Filed May 6, 1949
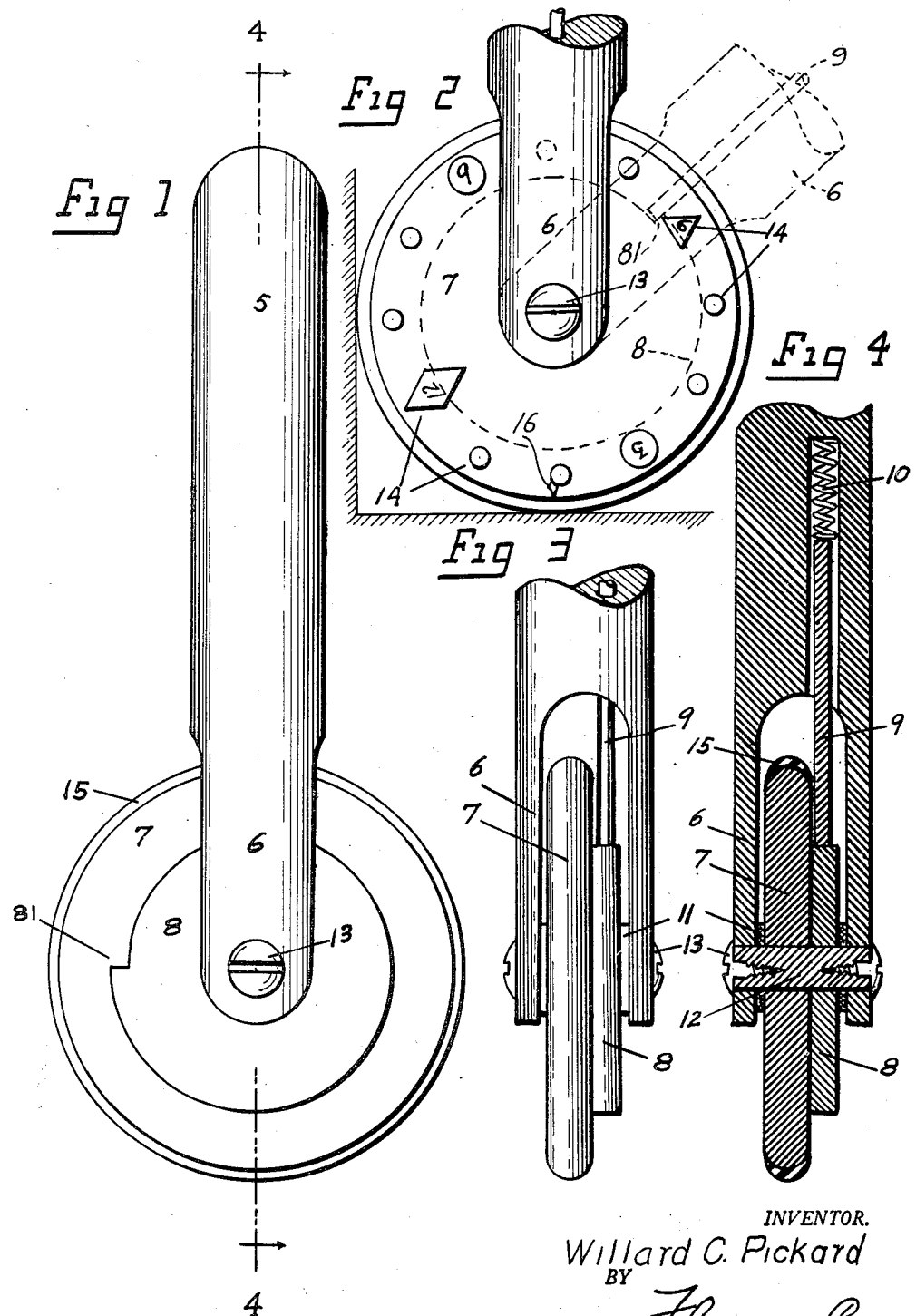
INVENTOR.
Willard C. Pickard
BY
Flournoy Corey.

Patented Dec. 15, 1953

2,662,292

UNITED STATES PATENT OFFICE 2,662,292

SPACE MEASURING MEANS

Willard C. Pickard, Cedar Rapids, Iowa

Application May 6, 1949, Serial No. 91,651

1 Claim. (Cl. 33—141)

This invention relates to measuring means and has particular relation to a roller type of instrument which may be rolled along the object or line to be measured and which will indicate the measurement of the object or line by audible sounds as well as visual reference.

Contractors, mortgage loan officials, surveyors, appraisers and others oftentimes must measure the interior and exterior of buildings, rooms therein, or parts thereof so as to determine the value or physical characteristics of such buildings or the dimensions of the buildings so as to determine the amount of material required to make repairs, alterations etc. To make these measurements with the ordinary tape or ruler, as along curved lines or on curved surfaces, is an arduous and tedious process, particularly for one man. Frequently it is necessary for the person making the measurements to make them alone and to carry a note book and pencil, so that he can note down the measurements as they are made. Such measurements must often be made in dark corners, closets, and the like, where it would be difficult to read tapes by visual reference.

It is one of the objects of my invention to provide a measuring device which avoids and overcomes these difficulties and which permits the operator to make his measurements with one hand and carry note book and pencil in the other.

A preferred embodiment of the invention employs a wheel or roller to roll over the surface of the object being measured, and frequently the measurements must be made beginning at an inside corner, in which case of course the contacting portion of the wheel will not reach the corner. It is one of the important objects of my invention to provide means to compensate for this condition, and to permit the operator to make accurate measurements even of surfaces such as closets and the like in which the starting point is an inside corner.

The ordinary measuring device usually requires the operator to be looking directly at the device, as it is being used, but a device constructed according to my invention permits the operator to make his measurements and watch where he is walking, which is conducive to personal safety. He can make measurements by the use of only one hand. A feature of the device, constructed according to my invention, is its light weight, smooth finished exterior, and small pocket size.

Another important object of my invention is to provide a device in which the operating parts of the mechanism are protected so that damage is very unlikely.

A still further object of my invention is to provide a device in which disassembly, repair and replacement of the parts are easily accomplished.

Another object of my invention is to provide a device in which the wheel of the device will not slip on the surface being measured, and still not scar or deface highly finished woods, decorated walls, etc.

Still another object of my invention is to provide a device which can be re-set to zero almost instantly with the same hand in which it is held and without looking at the instrument.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claim, without departing from the spirit of the invention.

In said drawings:

Figure 1 is a view in side elevation of the device constructed according to one embodiment of my invention.

Figure 2 is a view in elevation showing the other side of the device shown in Figure 1.

Figure 3 is a view in front elevation of the device shown in Figures 1 and 2, and Figure 4 is a view in section taken along the line 4—4 of Figure 1.

Referring, then, to the drawings; I preferably provide an approximately cylindrical handle and fork, illustrated and shown at 5 and 6 respectively. This handle may be turned as a cylinder, having a rounded end here illustrated, or it might be indented near the center to form a more pronounced handle portion. The handle is slotted, as indicated more particularly in Figures 3 and 4, to provide the fork portion 6, and this slot is adapted to receive the wheel 7 therein.

A cam 8 is secured to one face of the wheel, as illustrated in Figures 1, 3 and 4, and this cam preferably is an involute spiral, so that raising of the cam pin or follower 9 is at a uniform rate upon uniform rotation of the drive wheel 7.

The follower rod 9 is received within a suitable recess, illustrated in Figure 4, within the handle 5, and a coil spring 10 is positioned at the upper end of this recess so as to bias the follower rod 9 against the cam 8.

Positioning of the wheel in the slot is accomplished by washers 11 of suitable material, such as felt or the like, and the wheel rotates on an axle or shaft 12, the shaft 12 being retained in position by means of the screws 13.

I preferably construct the measuring device so that the outer circumference of the wheel is exactly 12 inches, and in order to facilitate measurements of less than 12 inches, I provide markers 1 inch apart on the wheel with four markers of distinctive form so that the operator may, by viewing or by just feeling the markers, ascertain what portion of a complete rotation has been made by the wheel as it rolls over the surface to be measured. For instance, the 3 inch and 9 inch markers may be a round peg, the 6 inch marker a triangular peg, and the 12 inch a diamond shape.

In this preferred embodiment of the invention, I provide a rubber rim for the wheel 7, as illustrated at 15, so that the wheel will not slip on the surface being measured, or cause scars or defacement.

An important feature of my invention is the provision of a corner correction marker, illustrated at 16. If an inside measurement is to be made and if the wheel is placed in the corner with the trailing edge of the wheel against the vertical wall and the marker 16 at the point adjacent to the wall where measurement is to be begun, the distance from the corner to the point of contact of the wheel is already measured and the operator has only to roll the device to the opposite edge of the member being measured in order to ascertain the measurement.

In usual practice, the inside or outside walls of a room or house are measured, rather than the floor or ceiling, so that the device is held in a horizontal plane with the wheel pressed against the surface of the wall and the handle usually inclined rearwardly from the wheel at about a 45 degree angle and, in fact, the position of the step 81 of cam 8 is so chosen with reference to the markers 14, that in the starting position, the zero point—that is, the 12 inch marker illustrated in Figure 2, normally is in a position adjacent to the beginning point of the object to be measured, with the handle held at approximately a 45 degree angle. Thus the operator has only to hold the handle at a 45 degree angle and the starting point indicator, which is the 12 inch marker, will be adjacent to the starting point of the object to be measured.

For example, when measuring a wall in this manner, the wheel is placed against the wall to be measured, as best shown in Figure 2, with the mark 16 adjacent the point of contact. In this position, the starting point marker 12 will be approximately 57 degrees ahead of the marker 16 and this will automatically compensate for the distance between the corner and the actual point of contact of the wheel against the wall being measured. With the handle inclined at approximately 45 degrees to either wall, when starting to measure from a corner, and with the indicator 16 in contact with the wall, the cam step 81 is so positioned on the wheel 7 as to be in line with the center line of the handle 5 (ignoring the slight correction necessary to compensate for the thickness of the cam follower 9). Thus the cam step will be approximately 192 degrees behind the marker 12.

The normal and convenient position of the handle, with reference to the wheel, is usually at a 45 degree angle with reference to the surface being measured, so the operator may measure a surface without being able to see the surface, merely by positioning the wheel adjacent the starting edge of the surface and rolling the wheel across and counting the clicks of the follower as it drops over the step 81 of the cam.

In operation, the device is usually held in the right hand with the indicator side of the wheel upward, as shown in Figure 2, although both faces of the wheel may be marked, permitting use in either direction, and the wheel is rolled along the line where measurement is desired. In this position—that is, the position shown in Figure 2, the wheel 7 runs clockwise as the wheel moves from left to right, and the cam 81 secured to the wheel 7 raises the follower pin 9 against the compression of the coil spring 10. As the step or cam nose 81 passes under the pin, the pin is forced inwardly of the cam by the spring, making an audible snap which indicates one revolution of the wheel or 12 inches, this being the circumference of the wheel in the present instance. The operator can thus determine the distance in feet by the snapping sound of the follower as it goes over the step 81. He can determine fractions of a foot or 1 inch measurements by means of markers on the side of the wheel and in easy view of the operator. Thus, small distances can be read directly as the wheel passes over the surface, either by the audible signal or by feeling or looking at the surface of the indicator.

In using the device, the starting point or 12 inch point of Figure 2 may be placed at the beginning of the surface to be measured, so that the 12 inch marker will be adjacent this surface and the cam nose will have just passed the pin.

If it is necessary to measure an inside surface, the point 16 is placed adjacent the surface to be measured, and thus correction for the inability of the curved wheel to reach to the starting point will be made.

The device may be reset with the same hand in which it is held by rotating it counter-clockwise (Figure 2) until the follower strikes against the vertical edge of the step 81, so that operation of the measuring device may be entirely by listening to the clicks and feeling the surface of the indicator.

An important feature of my invention is that it permits measurement of curved surfaces, as inside an arch, a cistern, or along a winding or curved line where any other means would be impractical.

Although I have described a specific embodiment of my invention, it is apparent that modifications thereof may be made by those skilled in the art. Such modifications may be made without departing from the spirit and scope of my invention as set forth in the appended claim.

I claim as my invention:

In a measuring device, a rod-like handle having a forked opening in one end thereof, a measuring wheel mounted for rotation within the forked opening, a cam in the form of an involute spiral disposed adjacent one face of the wheel for rotation therewith, a rod-like cam follower mounted for longitudinal reciprocation within the handle, and a spring within the handle urging the follower into contact with the cam, the wheel having a plurality of indicia thereon including a starting mark and a corner correction mark, the corner correction mark being positioned approximately one radian to the rear of the starting mark and the cam step being positioned approximately 192 degrees to the rear of the starting mark.

WILLARD C. PICKARD.

References Cited in the file of this patent

UNITED STATES PATENTS

| Number | Name | Date |
|---|---|---|
| 275,734 | Von Reitzner | Apr. 10, 1883 |
| 361,791 | Stoner | Apr. 26, 1887 |
| 889,225 | Haas | June 2, 1908 |
| 937,302 | Harris | Oct. 19, 1909 |
| 1,078,462 | Rapson | Nov. 11, 1913 |
| 1,433,640 | Morneau | Oct. 31, 1922 |
| 1,652,198 | Godley et al. | Dec. 13, 1927 |
| 1,997,584 | Howard | Apr. 16, 1935 |
| 2,467,515 | Young | Apr. 19, 1949 |
| 2,595,021 | Swanson | Apr. 29, 1952 |

FOREIGN PATENTS

| Number | Country | Date |
|---|---|---|
| 23,027 | Great Britain | of 1897 |
| 377,200 | France | July 3, 1907 |
| 64,680 | Austria | of 1914 |